United States Patent
Hinkov

(10) Patent No.: US 8,459,528 B2
(45) Date of Patent: Jun. 11, 2013

(54) ASSEMBLY FOR HEAD WELDING

(75) Inventor: Miroslav Ivanov Hinkov, Gabrovo (BG)

(73) Assignees: Mechatronica SC; STS Pack Holding, Ltd.

( * ) Notice: Subject to any disclaimer, the term of this patent is extended or adjusted under 35 U.S.C. 154(b) by 26 days.

(21) Appl. No.: 12/991,078

(22) PCT Filed: Apr. 24, 2009

(86) PCT No.: PCT/BG2009/000005
§ 371 (c)(1),
(2), (4) Date: Nov. 4, 2010

(87) PCT Pub. No.: WO2009/140744
PCT Pub. Date: Nov. 26, 2009

(65) Prior Publication Data
US 2011/0049220 A1    Mar. 3, 2011

(30) Foreign Application Priority Data
May 23, 2008   (BG) ...................................... 110143

(51) Int. Cl.
*B23K 5/22*     (2006.01)
*B65B 31/02*    (2006.01)

(52) U.S. Cl.
USPC ............ 228/46; 228/44.5; 228/47.1; 53/432; 53/433; 53/477; 156/69; 156/497

(58) Field of Classification Search
USPC ................... 228/46, 44.5, 47.1; 53/432, 471, 53/477, 478; 156/69, 497
See application file for complete search history.

(56) References Cited

U.S. PATENT DOCUMENTS

| | | | |
|---|---|---|---|
| 4,511,426 A * | 4/1985 | Linner | 156/497 |
| 4,938,818 A * | 7/1990 | Dzedzej et al. | 156/69 |
| 4,957,581 A * | 9/1990 | Jahrig et al. | 156/309.9 |
| 5,473,860 A * | 12/1995 | Linner | 53/432 |
| 5,577,907 A * | 11/1996 | Linn er | 432/159 |
| 5,618,365 A | 4/1997 | Rebeyrolle et al. | |

FOREIGN PATENT DOCUMENTS
WO    WO-9304845 A1    3/1993

OTHER PUBLICATIONS

International Search Report for PCT/BG2009/000005, mailed Oct. 5, 2009.

* cited by examiner

*Primary Examiner* — Devang R Patel
(74) *Attorney, Agent, or Firm* — Marshall, Gerstein & Borun LLP

(57) ABSTRACT

The assembly is intended for application to manufacturing of tubes, bottles, boxes. Characterized by improved quality of the weld and low reject percentage. It has a mandrel (1), on which there is a head (3) and a tube body (2), put over in a typical manner, as well as a cooling element, coaxial with the mandrel (1), and a nozzle D, coaxial with the mandrel. Said nozzle contains two parts—internal 7 and external (8)—which form channel (9) for feeding heating gas HG. The assembly consists of only one work station. The cooling element is also forming element OFE and consists of cooling metal ring 4, located in forming metal ring (6). There is heat-insulating ring (5) between the latter and the cooling metal ring (4). In the position of heating, said heat-insulating ring (5) is positioned around the end of the tube body (2). The heat-insulating ring (5) is of solid-state material or gas of low thermal conduction.

2 Claims, 4 Drawing Sheets

ASSEMBLY FOR HEAD WELDING

REFERENCE TO RELATED APPLICATIONS

This is the United States national phase under 35 USC 371 of international patent application no. PCT/BG2009/000005, filed Apr. 24, 2009, which claims priority to Bulgaria patent application BG 110143, filed May 3, 2008.

TECHNICAL FIELD

The assembly is intended for application to machines for head welding of components made of foil having one or more layers, especially to manufacturing of tubes, bottles, boxes, etc.

STATE OF THE ART

It is known an assembly for head welding [1] with a first working station FWS consisting of a mandrel, on which there is a head and a tube body, put over in a typical manner, as well as of a cooling element CE, coaxial with the mandrel, in said cooling element there being a channel for feeding a heating gas HG and a cooling zone. The cooling element CE stops at a position, such that an open heating chamber is formed and different heating is provided for the end of the tube body by forming two zones for its cooling—an internal one, cooled to a temperature lower than the melting point of the foil, and an end one, almost non-cooled and having a temperature which is a bit above the melting point of the foil. In the same time, the head is heated in the welding zone to a temperature being a bit higher than the melting point of the material of which said head is made. After drawing out the cooling element CE, the mandrel is moved, along with the heated head-tube body, to a second working station SWS, where a forming element is pressed to the heated head-tube body and remains in this position until the head and tube body are cooled. Then a forming element is drawn out of the working zone, and the body is removed. The process is repeated consecutively in the same order at both work stations.

A disadvantage of this assembly consists in the fact that the welds obtained are of poor quality, because in order to compensate for undesired cooling of heated welded components it is necessary to overheat said components at the first work station. This leads to undesired heating of the tube body over a distance greater than the needed one, which—during the following welding at the second work station SWS—causes undesired deformations that worsen the appearance of the weld, and very often lead even to rejection.

The objective of the present invention consists in creating an assembly for head welding, providing improved quality of the weld, and in simultaneous decreasing of reject percentage.

BRIEF DESCRIPTION OF THE INVENTION

The assembly for head welding consists of a mandrel, on which there is a head and a tube body, put over in a typical manner, as well as of a cooling element CE, coaxial with the mandrel, and a nozzle D, coaxial with the mandrel. Said nozzle contains two parts—an internal and external ones 8—which form a channel for feeding a heating gas HG. The assembly consists of only one work station. The cooling element is also a forming element and consists of a cooling metal ring located in a forming metal ring. There is a heat-insulating ring between the latter and said cooling metal ring. In the position of heating, said heat-insulating ring is positioned around the end of the tube body.

In the assembly for head welding, the heat-insulating ring is of a solid-state material or gas of low thermal conduction.

An advantage of the assembly for head welding is the fact that it is characterized by improved quality of the weld and ensures low reject percentage.

DESCRIPTION OF ACCOMPANYING FIGURES

The invention is explained in more details with reference to an exemplary embodiment of the assembly for head welding in a welding machine (not shown in the figures), where:

EXEMPLARY EMBODIMENT OF THE INVENTION

Figure 1:
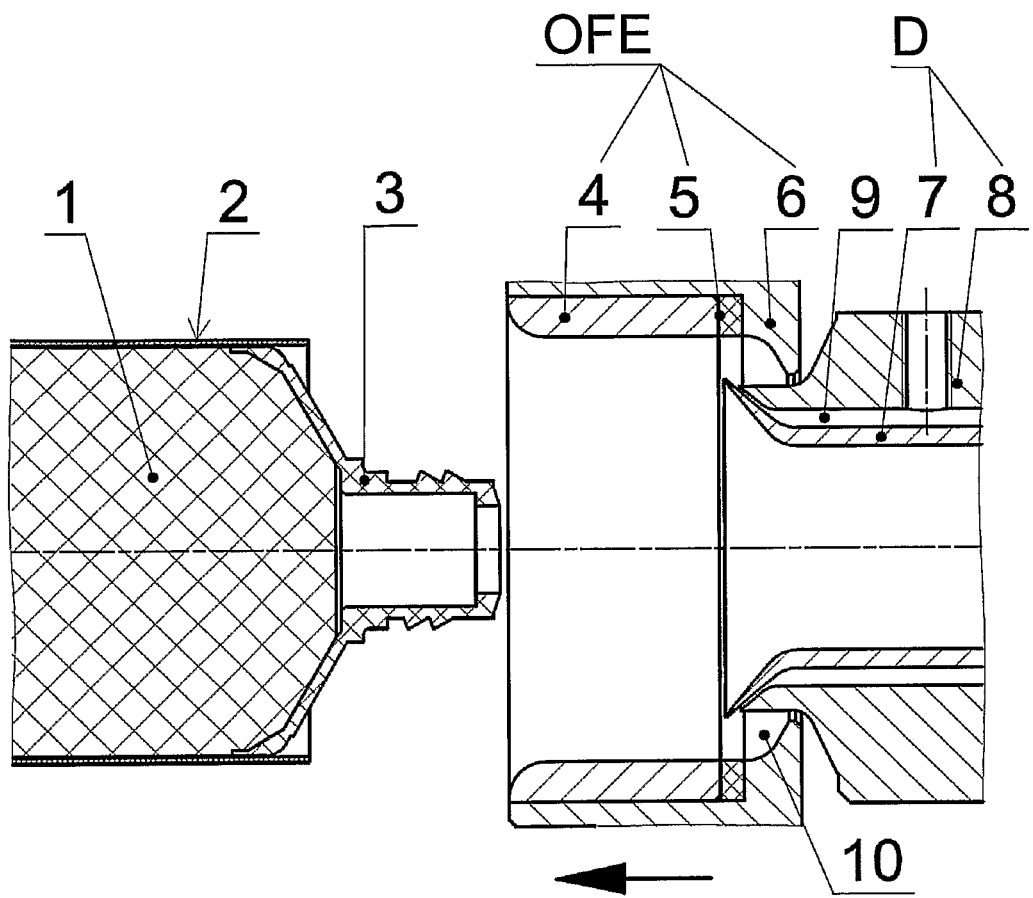
FIG. 1 is a longitudinal section of said assembly in initial position.
Figure 2:
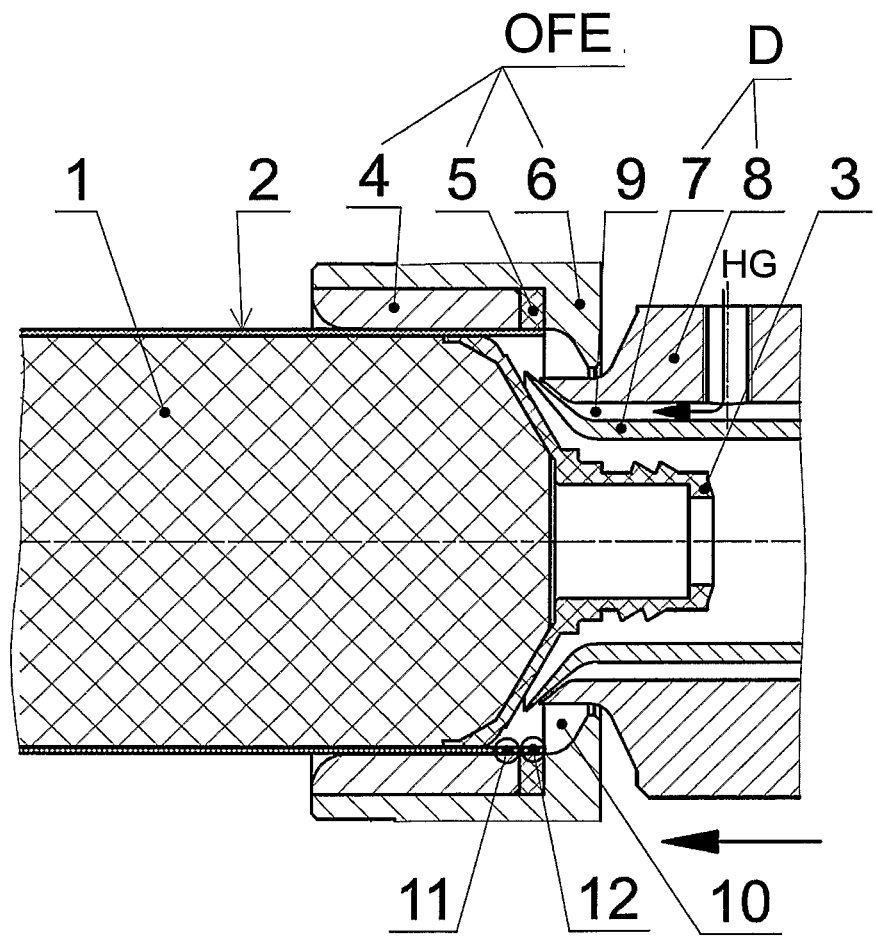
FIG. 2 is a longitudinal section of said assembly in the position of heating.
Figure 3:
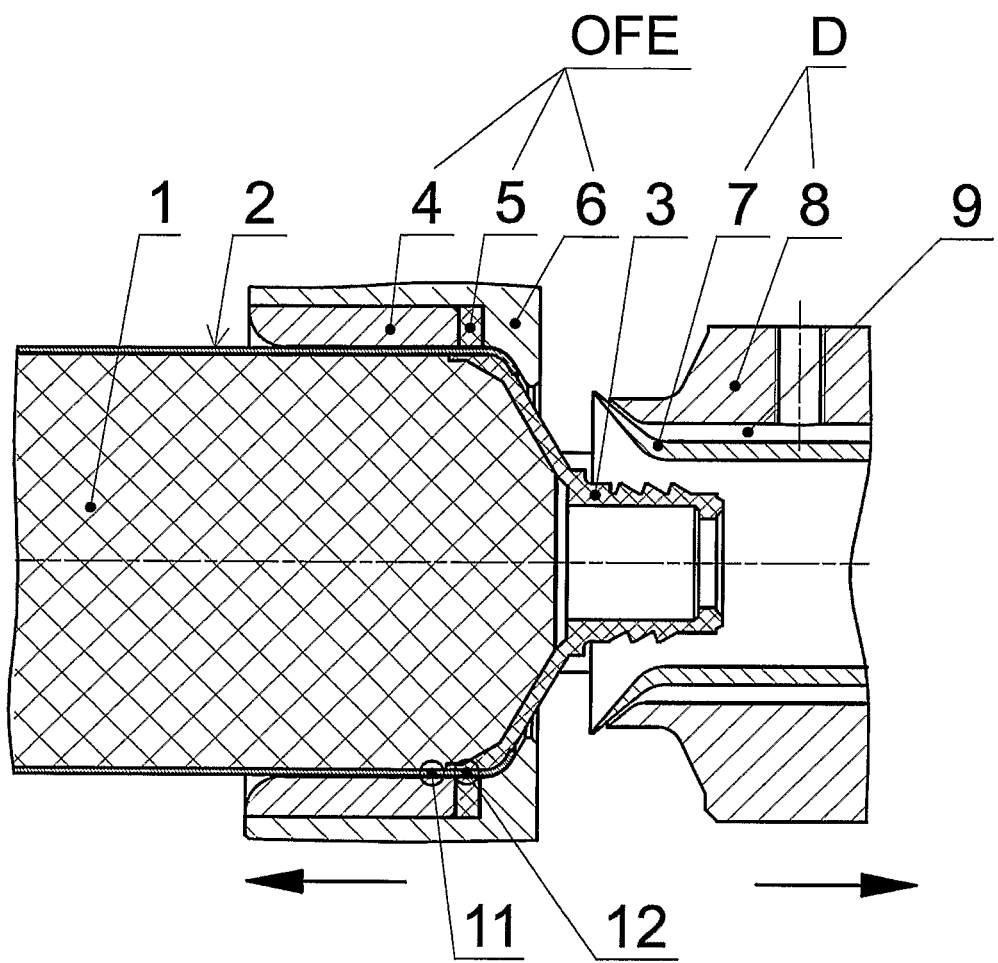
FIG. 3 is a longitudinal section of said assembly in the position of forming.
Figure 4:
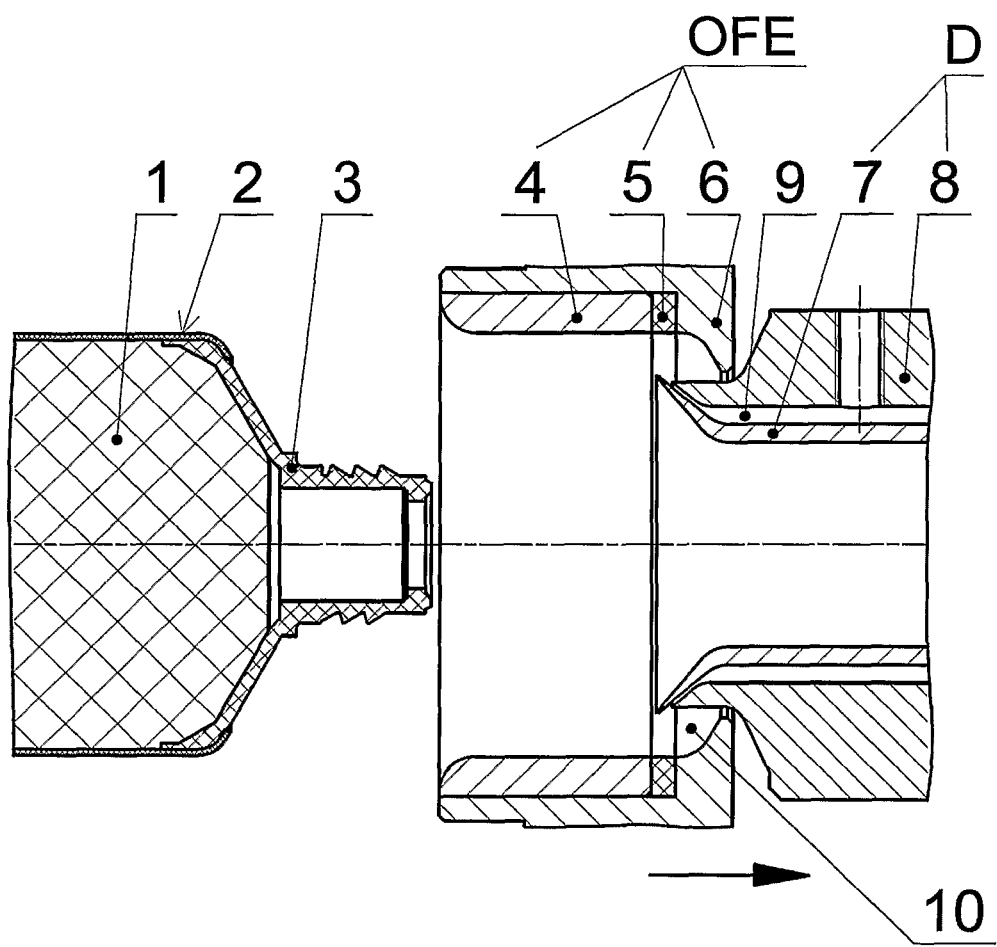
FIG. 4 is a longitudinal section of said assembly in final position.

The assembly for head welding in the figures consists of a mandrel 1, on which there is a head 3 and a tube body 2, put over in a typical manner, as well as of a cooling element, coaxial with the mandrel 1, and a nozzle D, coaxial with the mandrel 1. Said nozzle contains two parts—an internal one 7 and external one 8—which form a channel 9 for feeding a heating gas HG. The assembly consists of only one work station. The cooling element is also a forming element—OFE—and consists of a cooling metal ring 4 located in a forming metal ring 6. There is a heat-insulating ring 5 between the latter and the cooling metal ring 4. In the position of heating, said heat-insulating ring 5 is positioned around the end of the tube body 2.

In the assembly for head welding, the heat-insulating ring 5 is of a solid-state material or gas of low thermal conduction.

Functioning Of The Invention

The assembly for head welding functions as described below. After placing the head 3 and the tube body 2 on the mandrel 1, the element OFE is moved, along with the nozzle D, towards the zone of welding. Simultaneously with that, the heating gas HG is fed as well. The element OFE and nozzle D stop at a position where an open heating chamber 10 is formed, providing different heating of the end of the tube body 2 by forming two zones for its cooling—an internal one 11, cooled to a temperature lower than the melting point of the foil (by the cooling metal ring 4), and an end one 12, almost non-cooled and having a temperature which is a bit above the melting point of the foil (due to the heat-insulating ring 5), while, in the same time, the head 3 is heated in the welding zone to a temperature being a bit higher than the melting point of the material of which said head is made. After that the weld is formed (by the element OFE), and the nozzle D is returned into its initial position, as a result of which feeding of the heating gas HG to the zone of welding is terminated. After the weld is cooled, the element OFE is also drawn out to its initial position, the component obtained is removed from the mandrel 1 and again the head 3 and the tube body 2 are placed on the mandrel 1. Then the process is repeated. In such a way, as the forming is performed immediately after heating, it is not necessary to overheat the tube body 2. The weld obtained is of high quality, and the reject percentage is minimal.

Reference:
1. Manual for Operating a Machine for Manufacturing Laminate Tubes "Kombis® 5501", Mehatronika AD, Gabrovo, 2005.

The invention claimed is:

1. An assembly for head welding, the assembly formed as only one work station and consisting of:
    a mandrel, on which there is a head and a tube body;
    a cooling element coaxial with the mandrel; and
    a nozzle coaxial with the mandrel, said nozzle including two parts, an internal part and external part, the two parts forming a channel for feeding a heating gas,
    wherein said cooling element being also a forming element for forming a weld after heating and consisting of a cooling metal ring, located in a forming metal ring, and there being a heat-insulating ring between the forming metal ring and the cooling metal ring, such that in the position of heating each of said heat-insulating ring and said cooling metal ring contacts an outer surface of the tube body creating different heating of the end of the tube body by forming two zones for its cooling.

2. The assembly for head welding according to claim 1, wherein the heat-insulating ring is of a solid-state material or gas of low thermal conduction.

* * * * *